Figure 1:
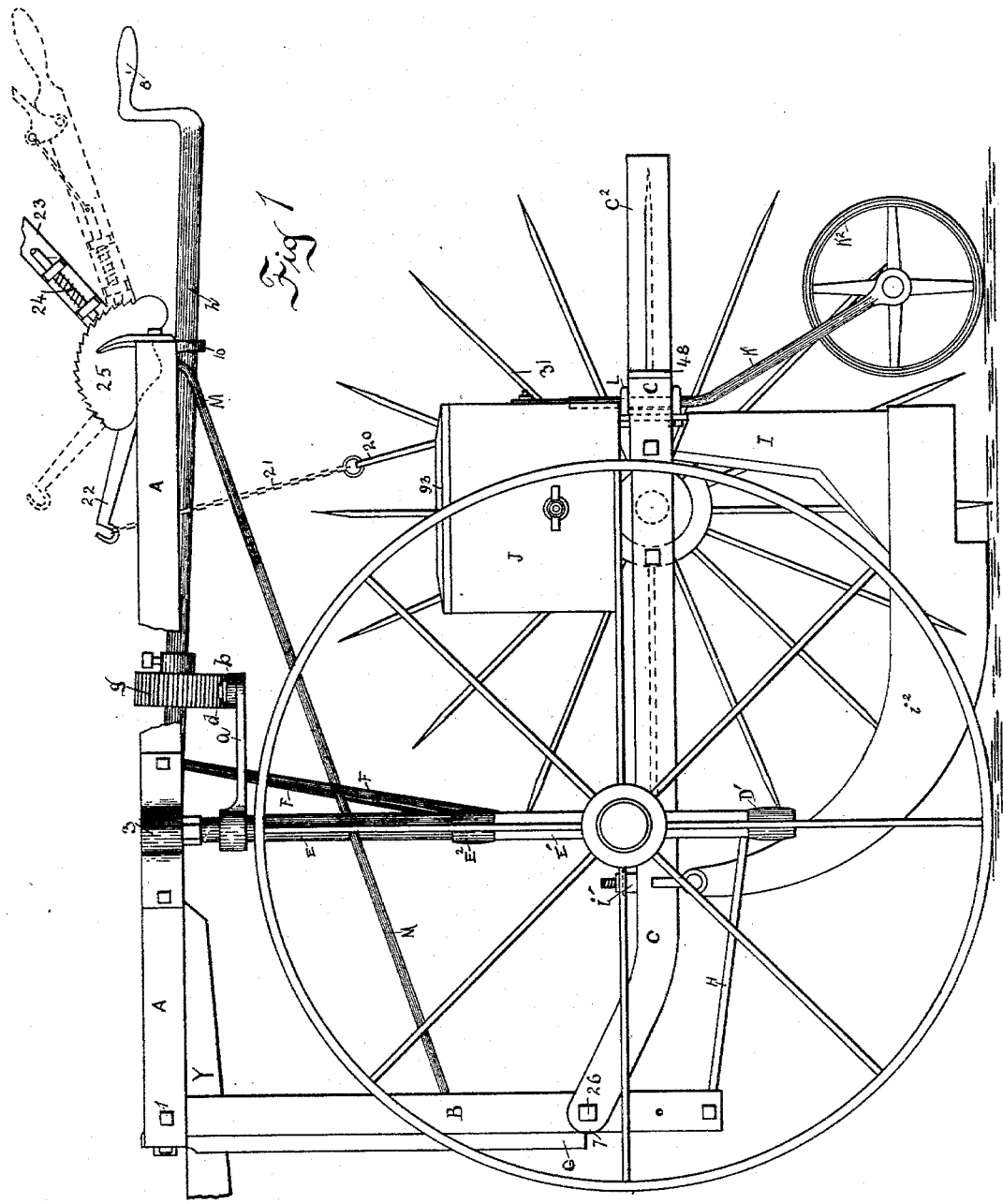

(No Model.) 5 Sheets—Sheet 1.

F. M. WALLACE.
SEED DRILL AND CULTIVATOR.

No. 589,879. Patented Sept. 14, 1897.

WITNESSES:
O. F. Dourow
G. P. Boles

INVENTOR
Franklin M. Wallace
BY
ATTORNEY.

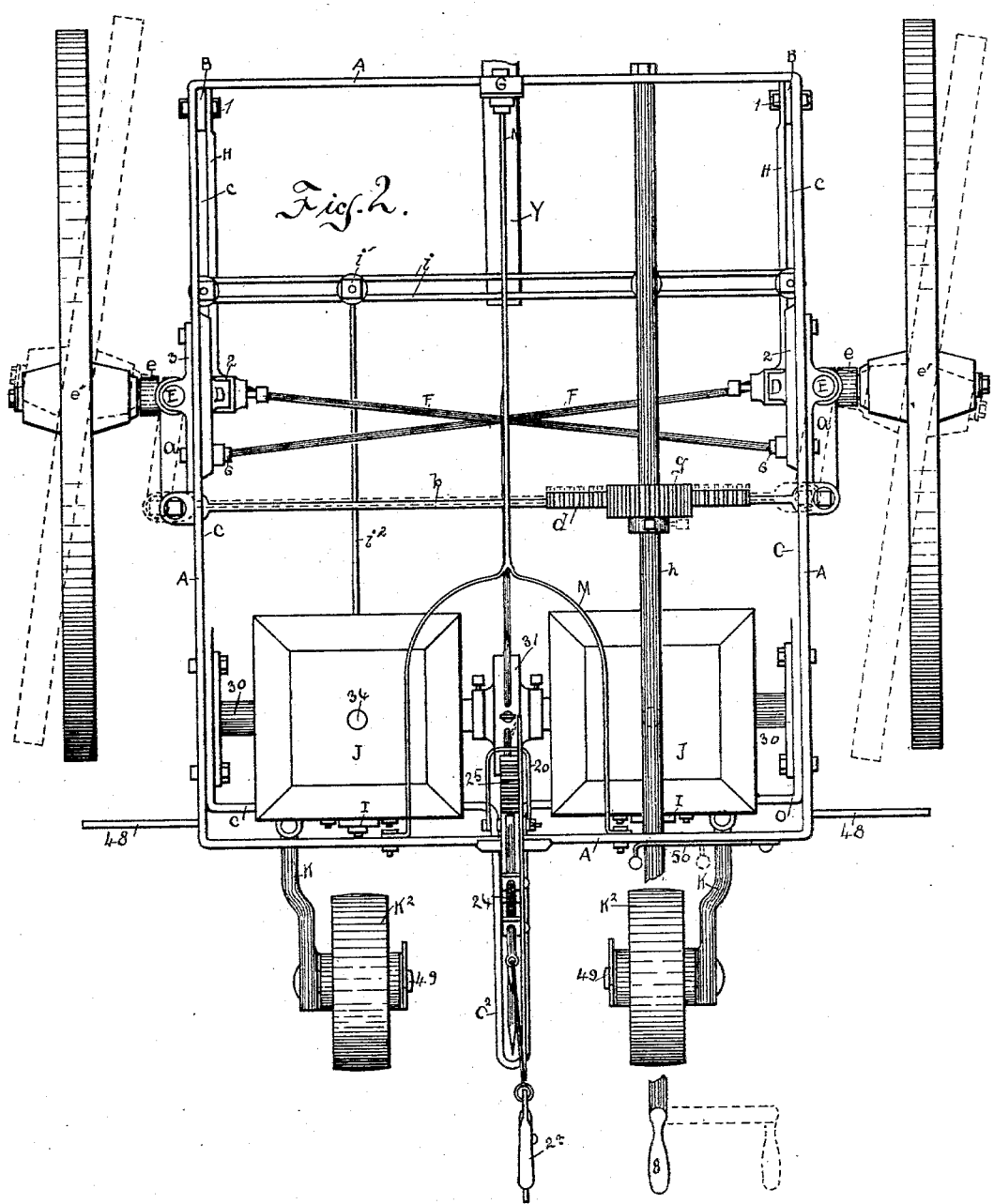

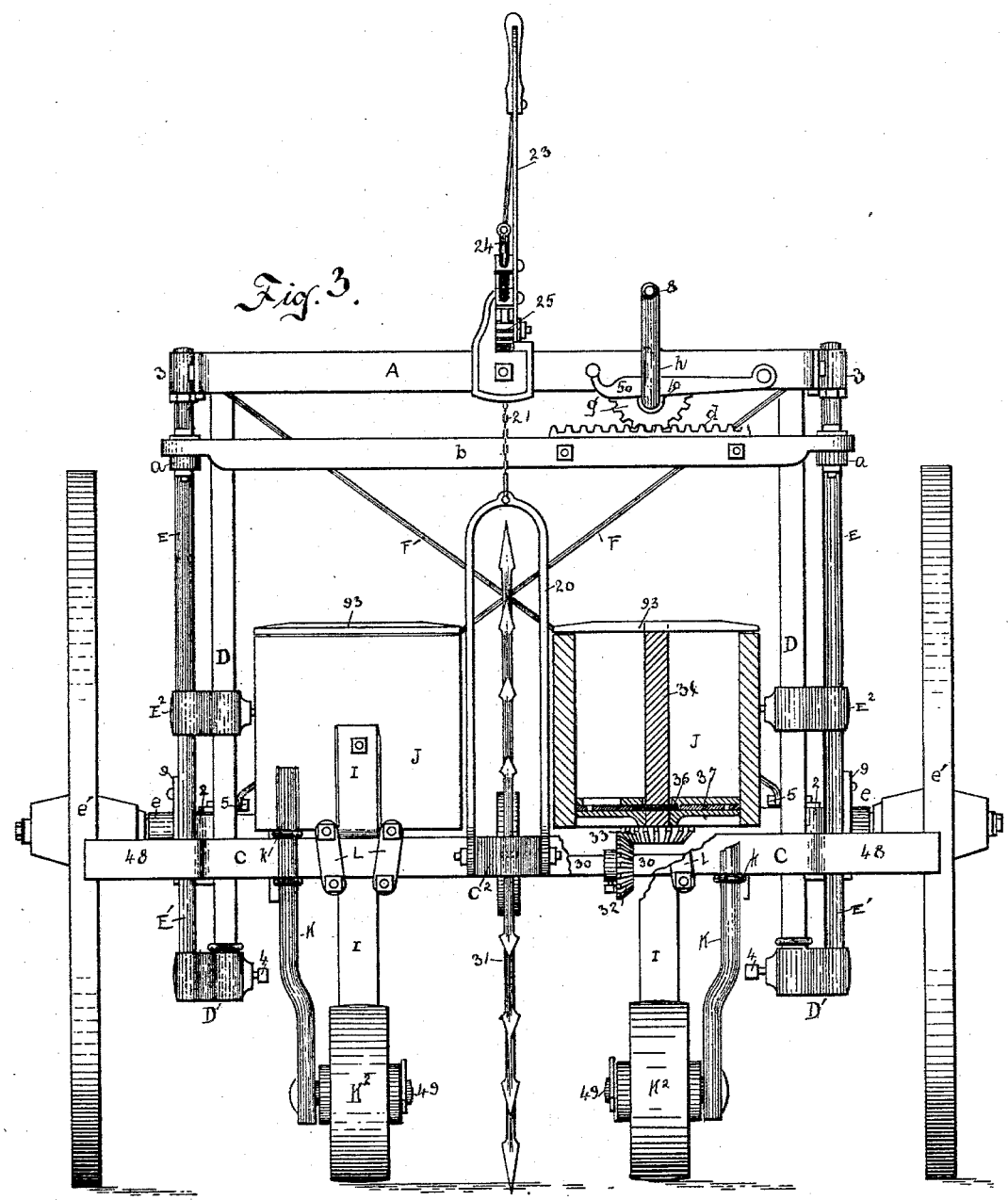

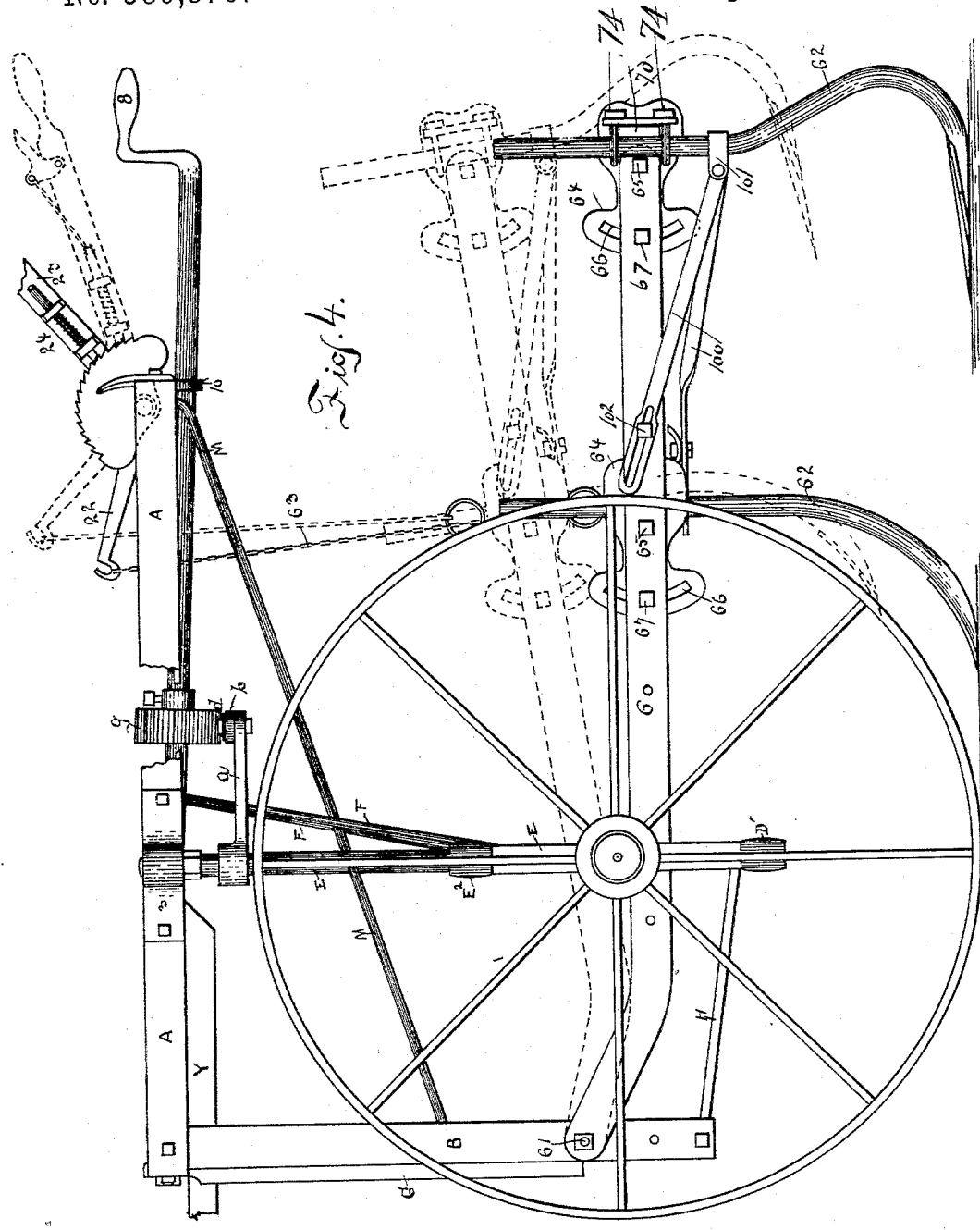

(No Model.) 5 Sheets—Sheet 5.
F. M. WALLACE.
SEED DRILL AND CULTIVATOR.
No. 589,879. Patented Sept. 14, 1897.
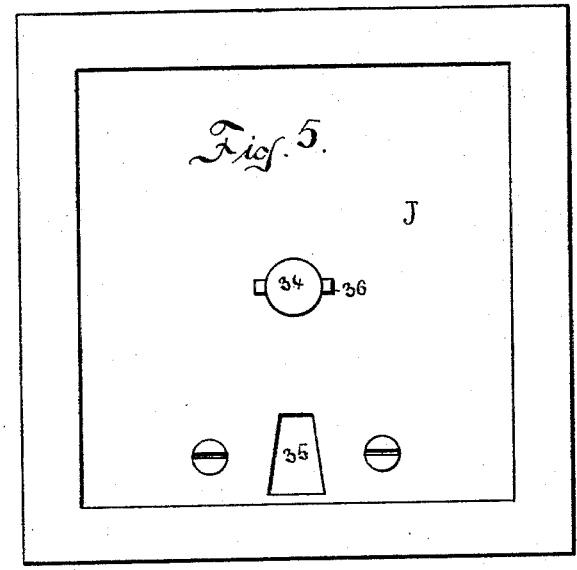
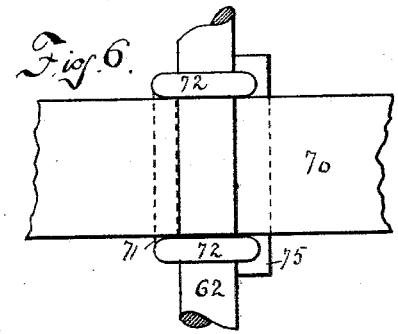
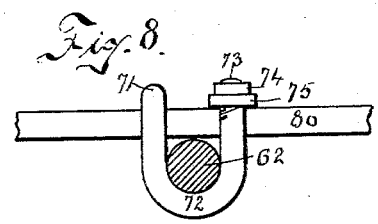
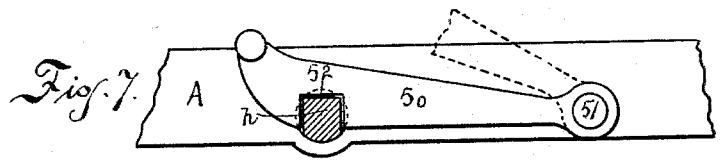
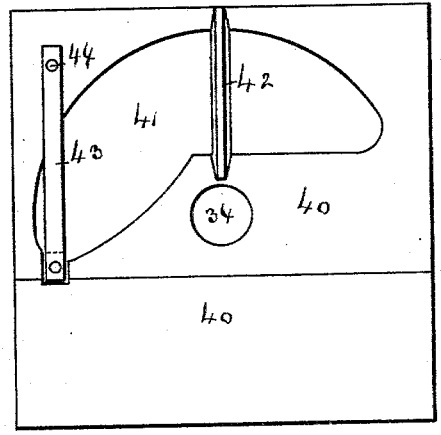
WITNESSES:
O. F. Douron
G. P. Bolser
INVENTOR
Franklin M. Wallace
BY C. M. Ames
ATTORNEY.

UNITED STATES PATENT OFFICE.

FRANKLIN M. WALLACE, OF NORTH BEND, NEBRASKA.

SEED-DRILL AND CULTIVATOR.

SPECIFICATION forming part of Letters Patent No. 589,879, dated September 14, 1897.

Application filed February 1, 1896. Serial No. 577,711. (No model.)

*To all whom it may concern:*

Be it known that I, FRANKLIN M. WALLACE, residing at North Bend, in the county of Dodge and State of Nebraska, have invented certain useful Improvements in Drills and Cultivators; and I do hereby declare that the following is a full, clear, and exact description of the invention, such as will enable others skilled in the art to which it appertains to make and use the same, reference being had to the accompanying drawings, which form a part of this specification.

This invention has relation to new and novel interchangeable drills and cultivators.

The object of my invention is to provide a compact serviceable implement that shall be arranged so as to be used for two purposes, as will be described more fully hereinafter.

In the accompanying drawings, Figure 1 shows a side elevation, with parts removed, of an interchangeable seed-planter and cultivator embodying my invention. Fig. 2 shows a top view thereof. Fig. 3 shows a rear end view thereof. Fig. 4 shows a side elevation with parts removed disclosing the position of the cultivator-frame, the planter-frame being removed. Fig. 5 shows a bottom view of one of the seed magazines or hoppers. Fig. 6 shows a top view of the cultivator-clip as used in my machine. Fig. 7 is a broken detached detail disclosing the locking-lever. Fig. 8 shows an end view of the cultivator-clip. Fig. 9 shows a top view of the feed-plate, while Fig. 10 shows a top view of the face-plate as positioned within the seed magazines or hoppers.

My invention comprises, essentially, a rectangular iron frame A, preferably of strap or bar iron, which is provided at two corners with downwardly-depending bars B B (shown in Figs. 1 and 2) and approximately intermediately with the downwardly-depending bars D D. (Shown also in Fig. 3.) The bars B B are secured to the upper frame by means of bolts 1 1, while the bars D are held above by means of an iron clip 2, (shown more clearly in Fig. 2,) which clip in turn is secured to the frame A, the bars D D being upon the inner side of the frame.

Secured at a point immediately opposite the clip 2 is a clip 3. (Shown clearly in the figures.) Secured to the bars D D, there being two of them, is a terminal shackle D', which is provided with a set-screw 4, and which shackle forms part of a rod comprising the upper round portion E and the lower square portion E'. Intermediately and at a point where the round portion terminates is positioned a second shackle $E^2$ to strengthen the connection between the bars D and E.

To give my frame, which is preferably a skeleton frame, sufficient stability, I provide in addition the cross-rods F F, which extend from the upper square frame A and are secured below by means of the bolts 5 to the bars D, being secured above my means of the bolts 6, as is shown in Fig. 2. Secured centrally to the frame A at one end is the depending bar G.

In referring to Fig. 2 it will be noticed that there is a space between the bars D and E. This space is used as a guide for the horizontal bars C, which are secured at their forward ends 7 to the downwardly-depending bars B, and then extend backward and inward to near the center when the bars form the loop $C^2$, as is more clearly shown in Fig. 2, though the loop is also shown in Figs. 2 and 3. The downwardly-extending bars B are further strengthened by means of the bars H, which form part of the lower shackle D', as is shown in Figs. 1 and 4. Secured to the bars E are the stub-axles e, to which are secured two ordinary supporting-wheels e'. Above the bars E are provided with the rearwardly-extending arms a, which arms are connected by means of the transverse rod b, as shown. The rods E are revolubly held within the shackles D', $E^2$, and 3 and the planter-frame is given direction by means of steering the wheels e' by means of the rod b, which is provided with a rack d, working in conjunction with a pinion g, secured to the rod h, provided with the handle 8.

Secured to the bars C C are the transverse bars i. These bars i in turn give support to the clips i', to which are movably secured the runners or furrow-openers $i^2$. These are in construction as those ordinarily employed in seed-planters embracing the upwardly-extending chutes I, in connection with a suitable seed-magazine J.

To steady the vehicle, I provide the lower frame C with the downwardly-extending bars K, which are provided below with an ordinary covering-wheel K². These bars K are secured by means of the clips k.

Referring to Fig. 3, the reference-numeral 9 represents upwardly-extending bars, by means of which the stub-axles e are secured to the bars E. The chutes I are further secured to the frame C by means of the clips L, as will be noticed in referring to Fig. 3.

Extending from the rear of the upper frame A, forwardly and downwardly, is the trident-shaped brace-bar M, which at its lower forward end is secured to the downwardly-depending bar B. The regulating rod or bar h is secured to the upper frame A by means of the supporting-collar 10.

Secured to the loop C² is an upwardly-extending loop 20, which is connected by means of the chain 21 to an arm 22, forming part of the lever 23, as is shown in Fig. 1, which lever is provided with a spring-pawl 24, working over a ratchet 25, secured to the upper frame A. Whenever it is desired to throw the shoe i² out of engagement with the ground, the lever 23 is thrown downward, which carries the connected frame C upward, which frame is pivoted to the downwardly-extending bars B by means of the bolt 26.

Working within the frame C and supported by the same is a shaft 30, (shown more clearly in Fig. 2,) which is provided with a stalking-wheel 31, used as a marker in disclosing the path of the drill. The shaft 30 is actuated by means of this stalking-wheel, which shaft at suitable points is provided with the bevel-gears 32, as shown, upon one side in Fig. 3, where a portion of the frame C has been broken away to show the position of the bevel-gear, which in turn meshes with a bevel-gear 33, mounted upon a shaft 34, which shaft passes centrally through the reservoir J, which, as stated, is supported by and forms part of the chute I, secured to the shoe i², as disclosed in Figs. 1 and 3. In Fig. 5 I have shown a bottom view of this reservoir and also disclosing the position of the shaft 34. This reservoir is provided within the bottom with an opening 35, through which the seed is permitted to escape, this opening being immediately below and communicating with the chute I.

Secured to the shaft 34, which is provided with a projecting bar 36, is a seed-plate 37, which is provided with the central opening 38, adapted to accommodate the shaft 34 and bar 36, as shown in Fig. 9. This seed-plate is provided with a number of openings x, made of a size to hold a proper quantity of seed, and this plate can be changed when different seed-grains are used in the drill. Over this plate 37 is placed a plate 40, which has a large opening 41, adapted to be filled by seeds, and below which the plate 37 revolves. To more readily remove this plate, I cast the same in two parts, as shown in Fig. 10, in which figure the reference-numeral 42 represents an ordinary bridge-piece of metal, adapted to strengthen the plate because of the opening 41.

43 represents a spring-arm secured by means of the pin 44, which spring-arm is adapted to ride over the plate 37 and brush away the seed, so as to prevent the binding of the seed within the plate when passing under the second plate-section 40, which, however, if the seed should be carried under the same, is permitted to ride upward until the seed comes above the chute-opening, when of course it is permitted to escape.

In Fig. 7 I have shown the method in which I lock the lever h by means of the dog 50, which is pivoted at the point 51 and provided with an opening 52, adapted to encompass the bar h, which at this point is provided with the square shoulder, permitting the locking of this bar.

As disclosed, my invention is capable of being changed into a cultivator by means of the two bars 60, (referring now to Fig. 4,) which bars are pivoted to downwardly-extending beam B by means of the bolts 61.

It should here be stated that whenever my device is adapted to be used as a cultivator the bolts 26 (shown in Fig. 1) are removed, as well as detaching the chain 21, when the wheel and carriage portion of my device can be removed, leaving the drill and seeder portion independent and detached. Now in using the cultivator I simply use the carriage portion, to which I attach the beam 60, having the cultivator-standard 62, the beam 60 being provided with the chain 63, which is secured to the arm 22 of the lever 23, as in the preceding case, the cultivator-shovel being raised or lowered by this lever 23.

The beam 60 is provided with the plates 64 64, secured by means of the bolts 65 65, and which plates have a slotted portion 66, within which is held an ordinary bolt 67, so that these plates, which are provided with transverse bar 70, can be adjusted.

To the transverse bar 70 are next secured the cultivator-standards 62, which are secured in a novel manner by means of a peculiarly-shaped shackle, referring now to Figs. 6 and 7, in which figures the shackle, which comprises a straight portion 71, is at its ends provided with the U-shaped extensions 72, which end in extending portions 73, threaded and adapted to receive the nuts 74, as is shown in Fig. 8, where, however, Fig. 6 discloses my shackle as secured to a flat bar 70, Fig. 8 disclosing my shackle as secured to a round bar 80. The two stems 73 are later united by means of the bar 75.

When the shovel-standards 62 are secured to a round bar 80—for instance, as shown in Fig. 8—it can be given a universal adjustment in a vertical plane, which would be permitted by means of the raising and lowering of the device, the U-shaped portion 72 permitting this, while at the same time the shovel-standard could be rotated in itself in a horizontal plane, while a circular motion in a vertical plane could be gotten through revolving the cultivator-shovel by the round bar 80.

In Fig. 6, where a flat bar is shown, an adjustment in a vertical plane and a rotary adjustment in a horizontal plane only can be obtained.

Now, having thus described my said invention, what I claim as new, and desire to secure by United States Letters Patent, is—

1. The combination with a carriage comprising a rectangular frame mounted upon wheels, said wheels being secured to stub-axles said stub-axles being controllable of a runner-frame detachably secured to said wheel-frame said runner-frame being provided with runners a stalking-wheel secured to said runners a projecting hollow seed-reservoir an opening within said seed-reservoir said runner communicating with said opening a plate provided with seed-openings revolving within said reservoir and a gear upon said projecting shaft to actuate said seed-plate, all substantially as and for the purpose set forth.

2. The combination with a carriage comprising a rectangular frame mounted upon wheels said wheels being secured to stub-axles said stub-axles being controllable of a runner-frame detachably secured to said wheel-frame means for raising and lowering said frame said runner-frame being provided with runners a stalking-wheel secured to said runners said stalking-wheel being provided with a projecting axle a seed-reservoir an opening within said seed-reservoir said runner communicating with said opening a plate provided with seed-openings revolving within said reservoir and a gear upon said projecting shaft to actuate said seed-plate, all substantially as and for the purpose set forth.

3. The combination with a wheeled frame the wheels of said frame being mounted upon stub-axles said stub-axles being controllable of a detachable frame secured to said wheel-frame said frame being rectangular cultivator-shovels and shackles for securing said cultivator-shovels to said detachable frame comprising a twin-shaped clip embodying the straight portion, 71, the two U-shaped clips, 72, terminating in the stems, 73, provided with the nuts, 74, all substantially as and for the purpose set forth.

In testimony whereof I affix my signature in presence of two witnesses.

FRANKLIN M. WALLACE.

Witnesses:
C. L. THOMAS,
G. P. BOLSER.